Patented Nov. 12, 1929

1,735,167

UNITED STATES PATENT OFFICE

SIDNEY H. IVERY, OF ST. LOUIS, MISSOURI, ASSIGNOR TO HYDRAULIC-PRESS BRICK COMPANY, OF ST. LOUIS, MISSOURI, A CORPORATION OF MISSOURI

METHOD OF SALT-GLAZING BRICK AND OTHER CLAY PRODUCTS

No Drawing.   Application filed February 24, 1928. Serial No. 256,813.

My invention relates particularly to a method of producing on the desired surfaces of building bricks, blocks, tiles, wall-caps, wall-tiles, roofing-tiles, drain elements and other building elements of coarse clay ware, a superficial coating which may be of many selected colors and which is salt glazed.

It is well known that where it is desired to salt glaze bricks, drain pipes and clay wares, common salt is thrown onto the fire in the kiln when the articles which are being fired have reached the proper stage of maturity. The soda from salt combines with the silica and alumina and other constituents of which the articles are made, forming complex silicates. The glaze thus produced is thin and transparent and the color is principally determined by the composition of the clay body.

Salt glazing is the cheapest known process for producing a glaze upon clay wares. By reason of the facts of its thinness and transparency and that the color of the article is limited chiefly by the composition and color of the clay body of the article when fired, the production of salt glazed coarse earthenware has been confined to those products in which the color of the clay body when burned was intended to show beneath the salt glaze.

The interposition between the coarse clay body of the brick or other earthenware and a salt glaze, of a slip or engobe of ingredients of a chemical and physical nature and relation different from those of the ingredients of the clay body of the brick or earthenware, has been heretofore unknown.

On the other hand where a color glaze has been desired, it has been necessary to produce an enameled surface (as distinguished from a salt glaze) generally requiring subjecting the articles to two and sometimes three firings. The enamel glazes heretofore employed require intricate and careful adjustment of their compositions to the clay bodies and great skill and care in the firing. There are considerable losses due to the unequal expansions of the body and the enamel glaze thereby causing crazing, peeling and other defects. It has been found necessary also in the enameling process, to fire the brick by indirect heat so as to protect the treated surfaces of the brick from contact with the dust, smoke and gases of the fire, and the firing by indirect heat is much more expensive than firing by direct heat. Enameled bricks are consequently expensive to make and must command a high price in the trade, whereas by the within described process the manufacturing cost of the products so produced, is reduced by about two-thirds.

There is a large field in which the products of this process can be used with equal satisfaction and at a much less cost than the enameled brick.

I have discovered that in one and the same firing or burning, in any of the well known forms of kilns in which it has been customary to salt glaze brick and other clay products, where the surfaces of the ware to be glazed are exposed to the gases of the fire, there can be affixed to the desired surfaces of such bricks or other coarse clay ware, a salt glaze of a complex chemical nature forming a coating of any desired color, resulting in a new article of manufacture which for many purposes will be found as desirable as the high priced enameled bricks, tiles or other clay ware, and will be more desirable than the ordinary salt glazed bricks or clay ware of commerce.

I have discovered that a mixture of kaolin, or china clay, alkali silicates of aluminium (such as certain of the feldspars), flint, a frit, or raw flux, and a quantity of ball clay or other binder, if applied to the surfaces of the unburned coarse clay or shale composing the body of the article and subsequently burned in any of the well known forms of kilns in which it has been customary to salt glaze brick, where the surfaces to be glazed are exposed to the gases of the fire, will vitrify and unite with the body and with the soda from common salt to form a salt glaze much thicker than the ordinary salt glaze and of a color contrastingly different from the normal color of the body of the article.

It is well known that sometimes in salt glazing red lead has been mixed with the common salt before it is thrown on the fire in the kiln. The object in so doing is to produce a reaction upon the alumina and silica of the body at a lower temperature than might be required where the reaction is induced by sodium gas alone. The glaze produced in such instances is softer and more destructible than the pure salt glaze. Such operations come within and are embraced in the art of salt glazing. Therefore in the use of the term "salt-glaze" I have intended to include the mixture of other volatile materials with the common salt or the use of other metallic salts or oxides, thrown upon the kiln fire during the firing of the ware in the usual manner for producing a salt glaze.

My method consists in applying to the desired surfaces, either to the damp column of clay as it comes from the brick making machine or to the individual bricks after they have been passed through the dryer or to the bricks as they come from the press by which they have been formed, but before firing, a slip coat or engobe which is a finely pulverized and homogeneous mixture consisting of kaolin or china clay, alkali silicates of aluminium (such as one of the feldspars) flint, a frit or raw flux, to which may be added as required sufficient plastic clay to cause cohesion of the ingredients as well as adhesion of the mixture to the brick, then drying the ware and the applied mixture. The ware is then set in the kiln in the manner suitable for firing or burning of salt glazes, so that the surfaces to be treated or glazed are exposed to the gases of the fire. When the temperature has caused the proper condition of maturity of the brick and its slip coat, salt is thrown upon the fire in the ordinary manner for making salt glazed ware and the firing is finished in the ordinary manner.

The above described process results in a white or nearly white glaze which is stronger, lighter colored and more perfect than the ordinary salt glaze. Further, the glaze can be made of many desired colors by adding to the slip coat or engobe before its application suitable coloring minerals such as metallic salts or oxides.

It is necessary that the slip coat or engobe should not require a substantially higher temperature for its maturity than is proper for the body which is to be glazed. The slip coat or engobe of the kind mentioned must be prepared to vitrify at the temperature of the maturity of the clay body. Providing that the temperature necessary for vitrification of the slip coat or engobe is suitable for the proper maturity of the clay or shale of which the ware is composed and will not cause excessive vitrification and consequent distortion of the clay body, no close accuracy in compounding the slip coat or engobe is required. I have found that the proportion of about 15% of a kaolin or china clay, 37½% of feldspathic material, 17½% of flint, and about 15% of a frit or raw flux, to which may be added sufficient ball clay or other plastic clay, to produce cohesion of the other ingredients, will constitute a mixture which will vitrify or fuse and combine with the alumina and silica of the body and further will unite with the soda from common salt to develop a superior salt glaze. I do not confine myself to the above proportions nor to the inclusion of all of the above ingredients. Many mixtures of minerals and chemicals fluxed to fuse or vitrify at a temperature within the proper heat range of the clays or shales composing the body of the ware will afford a sufficient base for the combination of coloring matter and the soda from common salt to form a salt glaze. If a chosen color is desired those skilled in the art will know how to include with the mixture a small amount of the particular minerals or metallic salts or oxides, which it is well known will give the desired tint. By "coarse clay articles" I mean brick, building blocks, wall-tile and caps, roofing-tile drain elements and other building elements.

Having thus described my process, what I claim is:

1. The process of making a salt glaze upon coarse clay articles by applying to the surfaces to be glazed, a mixture (slip or engobe) of kaolin, flint, alkali silicates of aluminium, frit, ball clay and a color ingredient; then drying the articles and the applied mixture, then placing the articles so treated in an ordinary salt glazing kiln in such manner that the surfaces of the articles to be glazed will be exposed to the gases of the fire, then burning or firing the articles and when the burn has about reached the finishing stage and the temperature is at or near its maximum, adding common salt to the fire.

2. The process of salt glazing coarse clay articles, which comprises the application to the surfaces desired to be glazed, before firing, of a mixture (slip or engobe) of kaolin, ball clay, flint, alkali silicates of aluminium and a frit vitrifiable at a temperature lower than that liable to cause distortion of the clay body; drying the surfaces treated; setting the articles in a kiln in such manner that the treated surfaces will be exposed to the gases of the fire; firing the articles in the usual manner for finishing said ware and salt glazing, and when the kiln is at or near its maximum temperature for the proper maturity of the body of the articles, throwing upon the fire common salt.

3. The method of producing salt glazed coarse clay articles, which comprises the exposure, during the proper stage of the firing in a kiln, of the surfaces of said products having an imposed coating of kaolin, ball clay, flint, alkali silicates of aluminium and a frit, to the action of the fumes of alkali salts.

4. The method of producing on the surfaces of coarse clay articles, a glazed coating which comprises the application to such surfaces before burning, of a mixture composed of kaolin, ball clay, alkali silicates of aluminium and a frit, placing the wares in a kiln and firing them in the usual manner and during such firing subjecting such surfaces to the action of the fumes of alkali salts.

5. The method of producing on the surfaces of coarse clay articles in the step of firing the same, an alumino-silicic glaze, which consists in applying to the desired surfaces of such articles before burning a mixture of aluminous and silicic minerals with other ingredients fusible at a temperature below the temperature of vitrification of the clay bodies of the said articles, placing such articles in a kiln in such manner as to expose said surfaces to the action of gases from the fire, firing said kiln to a temperature sufficient for the proper maturity of the clay bodies of said articles, and when this stage of firing has been attained, subjecting said surfaces to the action of the fumes of an alkali salt.

6. The method of producing glazed coarse clay articles, which comprises the application to a desired surface of the unfired article, of a coating comprising fine clay, flint and a flux, placing said article in a kiln with its coated surface exposed, firing and then subjecting the hot coated surface to the hot fumes of an alkali salt.

7. The method of producing glazed coarse clay articles, which comprises the application to a desired surface of the unfired article, of a slip coat or engobe comprising fine clay, flint and a flux, placing said article in a kiln with the coated surface exposed to the gases of combustion of the kiln, firing, and then adding a salt glazing ingredient to the fire.

8. The method of producing glazed coarse clay articles, which comprises the application to a desired surface of the unfired article (capable of salt glazing) of a coating of heat-fusible material, comprising finer clay and reactant when hot to hot salt-glazing vapors, placing said article in a kiln with the coated surface exposed to the gases of combustion of the kiln, firing and then subjecting the hot coated surface to a salt-glazing vapor.

9. The method of producing glazed coarse clay articles, which comprises the application to a desired surface of the unfired article, of a coating of heat-fusible material comprising finer clay and reactant when hot to a hot vapor of a metallic substance, placing said article in a kiln with its coated surface exposed, firing and then subjecting the hot coated surface to such hot vapor.

10. The method of producing glazed coarse clay articles, which comprises the application to a desired surface of the unfired article, of a coating of heat-fusible material comprising a finer clay and reactant when hot to a hot vapor of a metallic substance, placing said article in a kiln with its coated surface exposed to the gases of combustion of the kiln, and then subjecting the hot coated surfaces to such hot vapor.

Signed by me at St. Louis, in the State of Missouri, this 22nd day of February, 1928.

SIDNEY H. IVERY.